US006971868B2

(12) United States Patent  
Ciccone

(10) Patent No.: US 6,971,868 B2
(45) Date of Patent: *Dec. 6, 2005

(54) NOZZLE FOR INJECTION MOLD

(75) Inventor: Vince Ciccone, Kleinburg (CA)

(73) Assignee: Injectnotech Inc., Mississauga (CA)

( * ) Notice: Subject to any disclaimer, the term of this patent is extended or adjusted under 35 U.S.C. 154(b) by 176 days.

This patent is subject to a terminal disclaimer.

(21) Appl. No.: 10/466,715

(22) PCT Filed: Nov. 13, 2001

(86) PCT No.: PCT/CA01/01608

§ 371 (c)(1),
(2), (4) Date: Jul. 18, 2003

(87) PCT Pub. No.: WO02/40245

PCT Pub. Date: May 23, 2002

(65) Prior Publication Data

US 2004/0137106 A1 Jul. 15, 2004

Related U.S. Application Data

(63) Continuation-in-part of application No. 09/716,894, filed on Nov. 20, 2000, now Pat. No. 6,394,785.

(51) Int. Cl.[7] .............................................. B29C 45/20

(52) U.S. Cl. .................. 425/549; 264/328.15

(58) Field of Search .................... 425/549; 264/328.15

(56) References Cited

U.S. PATENT DOCUMENTS 5,554,395 A    9/1996 Hume
5,614,233 A *  3/1997 Gellert ................. 425/549
6,394,785 B1 * 5/2002 Ciccone ................ 425/549

FOREIGN PATENT DOCUMENTS

| CA | 2082700 | 5/1994 |
| EP | 0633118 | 1/1995 |
| EP | 0854027 | 7/1998 |

* cited by examiner

Primary Examiner—Tim Heitbrink
(74) Attorney, Agent, or Firm—Ladas & Parry LLP

(57) ABSTRACT

A nozzle (10) and gate (18) for a plastic injection mold (12) wherein the gate (18) has a primary sealing surface (50) located adjacent to the vestige (22) and a secondary sealing surface (54) located behind or inwardly of the primary sealing surface (50). The nozzle (10) has an insert retainer (42) threadably mounted therein to hold a tip or torpedo type insert (64). The insert retainer (42) has an outer annular primary seal (46) which engages the gate primary sealing surface (50), and an intermediate annular secondary seal (56) which engages the gate secondary sealing surface (54). The primary seal (46) prevents hot plastic from passing behind the nozzle and the secondary seal (56) ensures that even if some plastic gets behind the primary seal, it will not pass behind secondary seal (56) and contact heating coil (33). The main body portion may be shaped to form a third seal (80) for engagement with the secondary sealing surface (54) behind the position of the secondary seal (56).

10 Claims, 6 Drawing Sheets

NOZZLE FOR INJECTION MOLD

CROSS REFERENCE TO RELATED APPLICATIONS

The present application is a Continuation-in-Part of U.S. application Ser. No. 09/716,894 filed on Nov. 20, 2000, now granted as U.S. Pat. No. 6,394,785.

TECHNICAL FIELD

The present invention relates to plastic injection molds, and in particular, to nozzles and gates for the hot runner system of such injection molds.

BACKGROUND ART

Injection molds can have gates machined into either the cavity or core portion of the mold, or they can have separate gate inserts that are mounted in the mold cavity or core. The gates or gate inserts contain the nozzles that inject the hot plastic into the mold cavity. The nozzles are fed from manifolds that are part of the hot runner system for the injection mold.

In order to prevent the hot plastic being injected into the mold cavity from leaking back behind the nozzles during the injection process, it is necessary to provide a seal between the outlet end of the nozzle and the adjacent portions of the gate or gate insert. If the hot plastic does leak back behind the nozzle, it usually ruins any heating coils used to keep the nozzle hot, or it at least causes a time consuming clean up operation with consequent machine downtime.

It is difficult to get a good seal between the nozzle outlet or tip and the adjacent gate surfaces because the surface area of the mating components must be kept small to avoid too much heat loss. Further, the mating components are subject to wear because of thermal expansion and contraction during the molding process.

The present invention gives improved sealing by providing a double seal; a primary seal adjacent to the vestige and a secondary seal located behind the primary seal away from the nozzle outlet.

DISCLOSURE OF THE INVENTION

According to one aspect of the invention, there is provided a nozzle for use with a plastic injection mold gate defining a vestige. The nozzle comprises a main body portion including a central bore having an inlet portion, an enlarged threaded outlet portion and an annular shoulder separating the portions. A nozzle insert is located in the outlet portion and the insert includes an annular flange adapted to engage the annular shoulder. A hollow threaded insert retainer is threadably mounted in the outlet portion. The insert retainer has an inner annular shoulder for clamping engagement with the nozzle insert annular flange. An outer annular primary seal is adapted to sealingly engage the mold gate behind the vestige. An intermediate secondary sealing ring is adapted to sealingly engage the mold gate behind the primary seal.

According to another aspect of the invention, there is provided a gate insert and nozzle combination which comprises a hollow gate insert body defining a vestige. A first cavity is located behind the vestige and has an annular wall portion defining a primary sealing surface adjacent to the vestige. A second cavity is located behind the first cavity and has an annular wall portion defining a secondary sealing surface. A nozzle is located in the hollow gate insert body. The nozzle has a main body portion including a central bore having an inlet portion, an enlarged threaded outlet portion and an annular shoulder separating the portions. The nozzle also has a nozzle insert located in the outlet portion. The insert includes an annular flange adapted to engage the annular shoulder. The nozzle also includes a hollow threaded insert retainer threadably mounted in the outlet portion. The insert retainer has an inner annular shoulder for clamping engagement with the nozzle insert annular flange. An outer annular primary seal sealingly engages the gate insert primary sealing surface and an intermediate secondary sealing ring sealingly engages the gate insert secondary sealing surface.

In accordance with a further aspect of the invention, the main body portion forms a third annular surface adapted to sealingly engage the gate insert secondary sealing surface at a position behind the secondary sealing ring, thereby creating a third seal off.

BRIEF DESCRIPTION OF THE DRAWINGS

Preferred embodiments of the invention will now be described, by way of example, with reference to the accompanying drawings, in which.

BEST MODE FOR CARRYING OUT THE INVENTION

Figure 1:
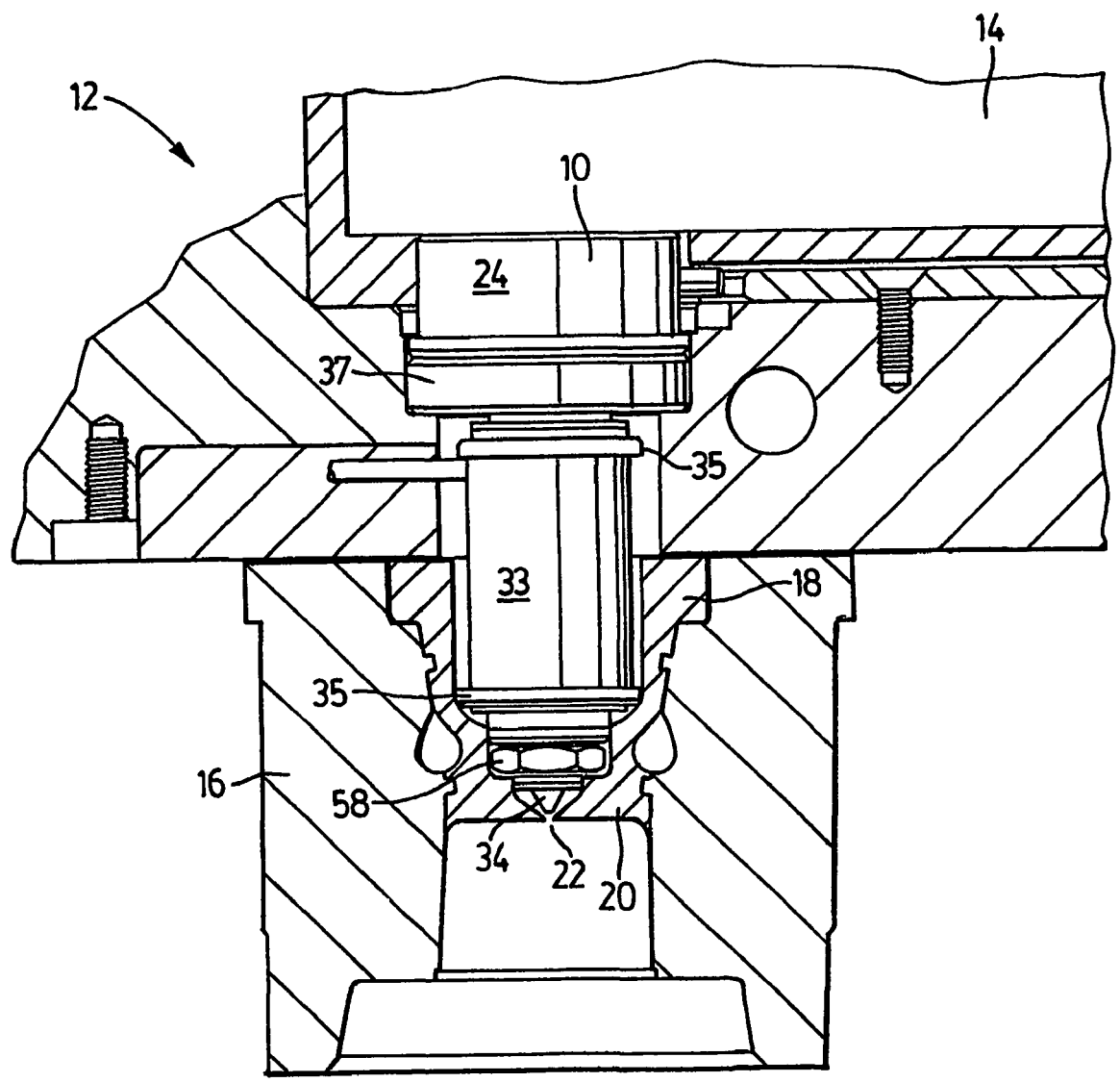
FIG. 1 is an elevational view, partly in section, of a preferred embodiment of a gate insert and nozzle combination according to the present invention.

Referring firstly to FIG. 1, a nozzle 10 is shown mounted in an injection mold 12. Injection mold 12 includes a manifold 14 which is part of the mold hot runner system for delivering hot molten plastic to nozzle 10. Injection mold 12 includes a cavity portion 16 which is the female portion of the mold defining the shape of an article to be injection molded. A separate hollow gate insert 18 is mounted in cavity 16, but gate insert 18 could be machined as an integral part of cavity 16, if desired. Gate insert 18 includes a body 20 which defines a vestige 22 through which hot plastic is injected. Injection mold 12 and cavity 16 can be any configuration desired and are not considered to be part of the present invention, per se.

Figure 2:
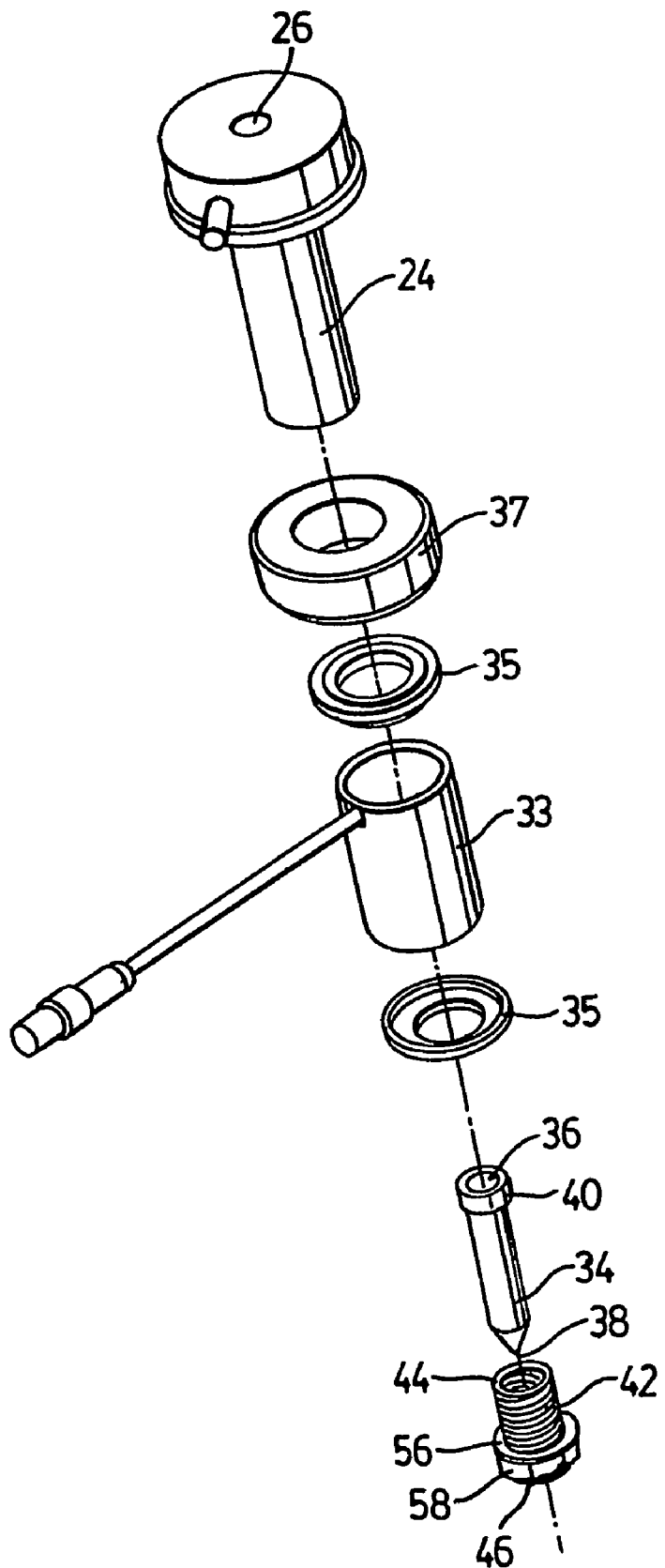
FIG. 2 is an exploded perspective view of the nozzle and associated components shown in FIG. 1.
Figure 3:
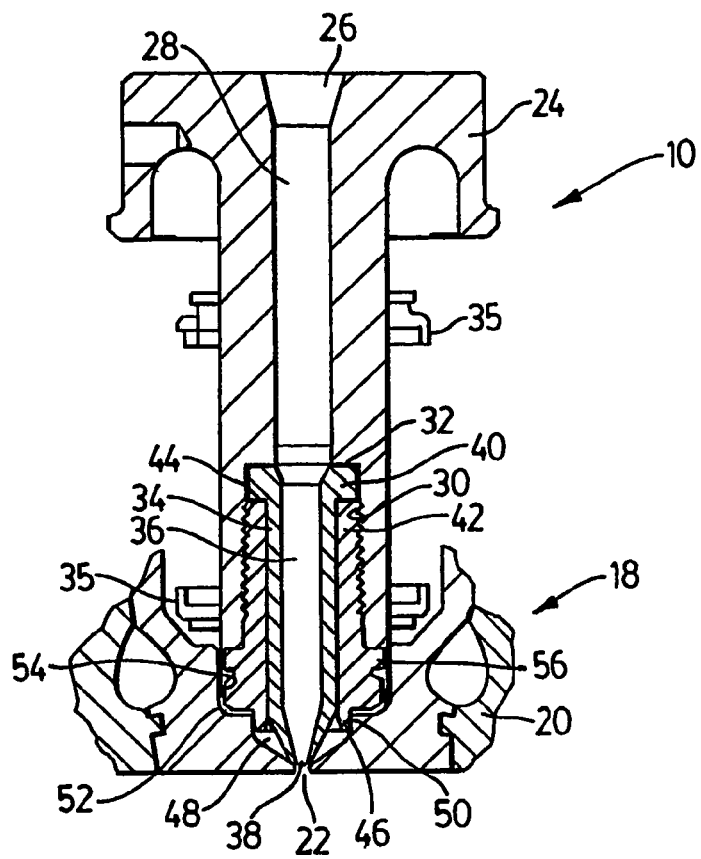
FIG. 3 is a vertical sectional view of the nozzle shown in FIG. 1.

Referring next to FIGS. 1 to 3, nozzle 10 includes a main body portion 24 which includes a central bore 26. Central bore 26 has an inlet portion 28 (see FIG. 3), an enlarged, threaded outlet portion 30, and an annular shoulder 32 separating the inlet portion 28 and outlet portion 30. A heating coil 33 (omitted from FIGS. 3 to 5 for clarity) is mounted on main body portion 24. Heating coil 33 is held in place by retainers 35. An adapter ring 37 helps position nozzle 10 in mold 12. Heating coil 33, retainers 35 and adaptor ring 37 can be configured differently, if desired.

Referring in particular to FIG. 3, a nozzle insert 34 is located in outlet portion 30 of main body central bore 26. Nozzle insert 34 is in the form of a direct sprue nozzle tip and it has a central passage 36 communicating with the central bore inlet portion 28, and an outlet opening 38 at its tip through which the hot plastic is actually injected. Nozzle insert 34 also has an annular flange 40 that is adapted to engage annular shoulder 32. Nozzle insert 34 is normally made of beryllium copper.

A hollow threaded insert retainer 42 is threadably mounted in the central bore threaded outlet portion 30. Insert retainer 42 has an inner annular shoulder 44 for clamping engagement with the nozzle insert annular flange 40. Insert retainer 42 also has an outer, annular primary seal 46 adapted to sealingly engage the mold gate body 20 behind vestige 22. Actually, mold gate body 20 has a first cavity 48 which defines an annular wall portion defining a primary sealing surface 50 located behind and adjacent to vestige 22. The insert retainer annular primary seal 46 engages the insert annular, primary sealing surface 50 to prevent hot plastic from passing backward behind nozzle 10. Alternately, the annular primary seal may be formed by the outer annular surface of a thermal separation ring (not shown), sealingly engaged against the primary sealing surface, the ring being positioned over the insert retainer. The ring may be comprised of titanium or other suitable material.

Gate insert 18 also has a second cavity 52 located behind first cavity 48. Second cavity 52 also has an annular wall portion which defines a secondary sealing surface 54. Insert retainer 42 is formed with an intermediate, secondary sealing ring 56 adapted to sealingly engage the mold gate behind the primary seal 46. Actually, secondary sealing ring 56 engages secondary sealing surface 54. This secondary sealing ring 56 ensures that even if some plastic gets behind primary seal 46, that it will not pass behind secondary sealing ring 56 and contact heating coil 33.

It should also be noted that when nozzle 10 is assembled in gate insert 18, the secondary sealing ring 56 engages secondary sealing surface 54 before the primary seal 46 engages primary sealing surface 50. The secondary sealing ring 56 thus guides the primary seal 46 into position, thus protecting it from damage during assembly and disassembly of mold 12, especially if thermal expansion and/or contraction affect the fit between primary seal 46 and primary sealing surface 50.

Insert retainer 42 also has a gripping flange 58 located between the annular primary seal 46 and the secondary sealing ring 56. Gripping flange 58 is in the form of a star type, hexagonal or octagonal bolt head, so that a wrench can be used to tighten insert retainer 42 in main body portion 24 and tightly clamp nozzle insert 34 in place.

Figure 4:
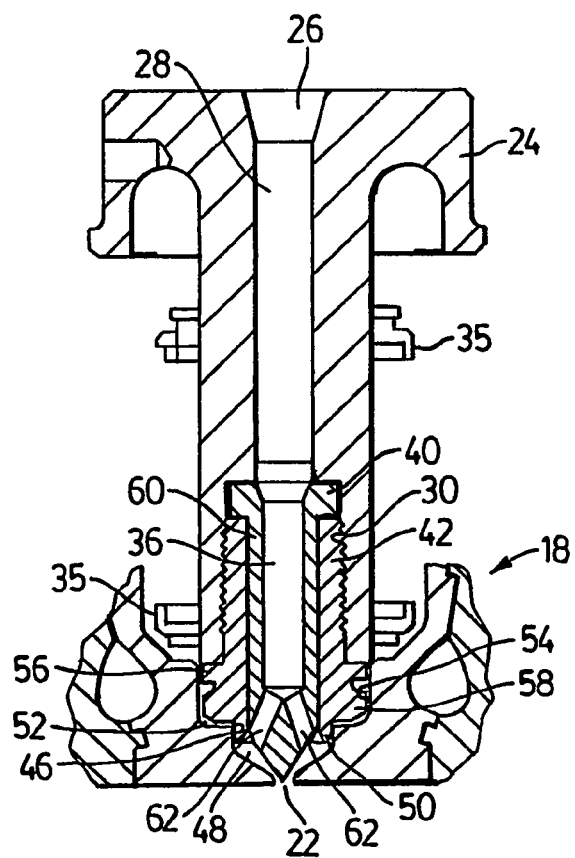
FIG. 4 is a vertical sectional view similar to FIG. 3, but showing another preferred embodiment of a nozzle having a split flow tip.

Referring next to FIG. 4, another preferred embodiment of the invention is shown which is substantially the same as the embodiment of FIGS. 1 to 3, except that the FIG. 4 embodiment employs a split flow nozzle insert or tip 60. Like reference numerals are used in FIG. 4 to indicate components that are the same as in the embodiment of FIGS. 1 to 3. Nozzle tip 60 has a plurality (usually two or three) of radially disposed outlet channels or outlets 62 that communicate with the nozzle tip central passage 36. Hot plastic passing through outlets 62 passes through first cavity 48 and out through vestige 22.

Figure 5:
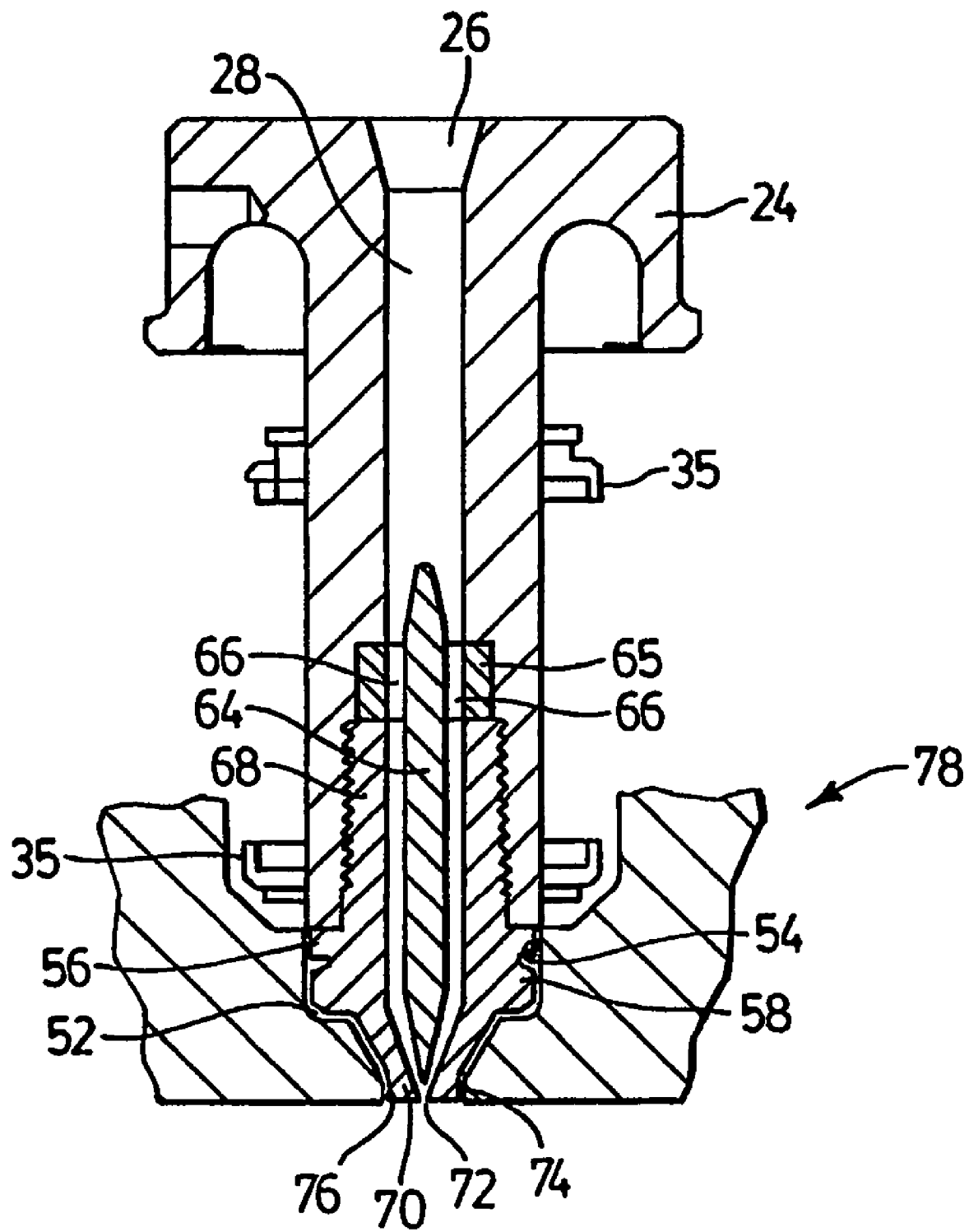
FIG. 5 is a vertical sectional view similar to FIG. 3, but showing another preferred embodiment of a nozzle having a torpedo type insert.

Referring next to FIG. 5, another preferred embodiment of the invention is shown which again is similar to the previous embodiments, except that the FIG. 5 embodiment employs a torpedo type nozzle insert 64. Also in this embodiment, like reference numerals are used to indicate components that are the same as in the previous embodiments. Torpedo type insert or tip 64 has an annular flange 65 that has axial flow openings 66 therethrough to permit hot plastic to flow through flange 65. In this embodiment, insert retainer 68 has a distal end portion 70 that defines the sprue or vestige 72 and also forms the primary seal 74 with an adjacent annular first cavity 76 in gate insert 78. In other words, primary seal 74 also defines the nozzle outlet 72

Figure 6:
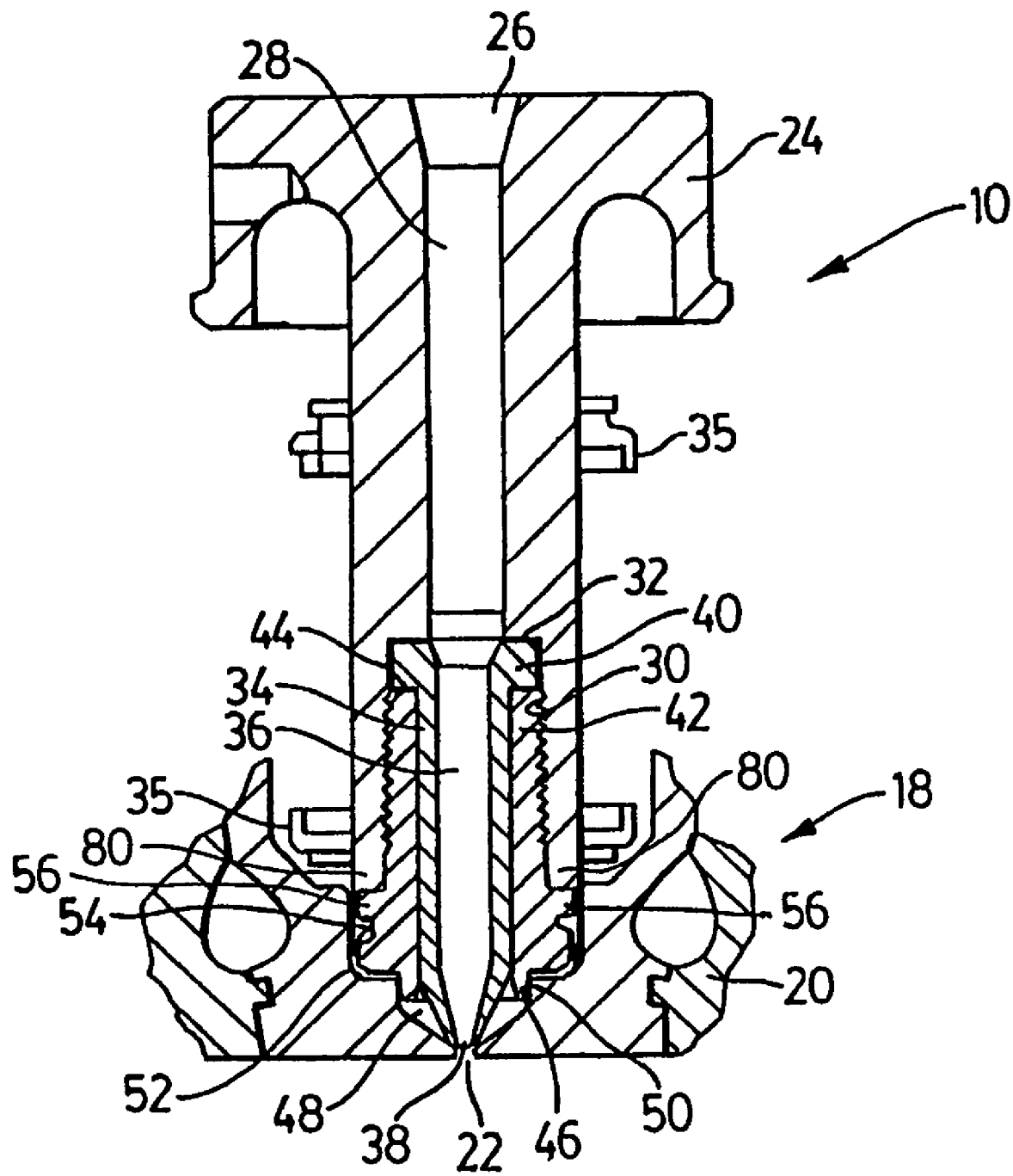
FIG. 6 is a vertical sectional view similar to FIG. 3, but showing another preferred embodiment of a nozzle having third seal off.
Figure 7:
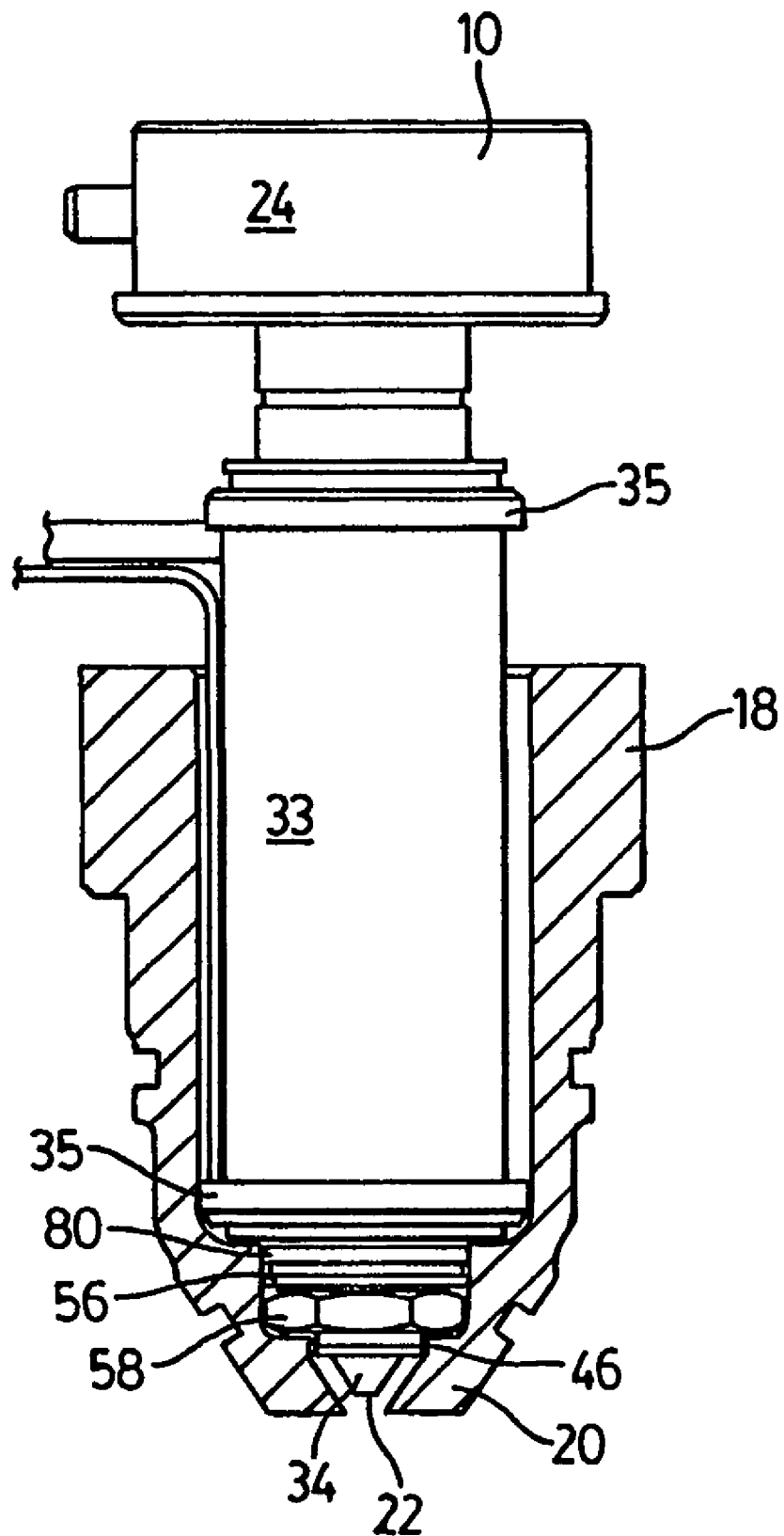
FIG. 7 is an elevational view of a portion of a further embodiment of the invention, similar to that of FIG. 1, illustrating a third seal off.

Having described preferred embodiments of the invention, it will be appreciated that various modifications can be made to the structures described above. For example, other types of nozzle inserts or tips can be employed in the present invention. Other types of heating coils can be used as well. Main body portion 24 can be configured and mounted differently. For example, as shown in FIG. 6, the main body portion 24 may be configured to include a third sealing ring 80 which engages the secondary sealing surface 54 at a position behind the second sealing ring 56 when the nozzle 10 is inserted in gate insert 18. Although this third sealing ring 80 is shown in an embodiment of the invention in FIG. 6, it should be understood that the main body portion may be configured to form the third sealing ring 80 in the embodiments of the invention shown in FIGS. 4 and 5. Preferably the third sealing ring 80 and second sealing ring 56 will engage the secondary sealing surface 54 before the primary seal engages the primary sealing surface 50. The third sealing ring 80 is preferably shaped to snugly press against the secondary sealing surface 54 creating a seal prior to the primary seal engaging the primary sealing surface. This ensures that even if the fit between the primary seal 46 and primary sealing surface 50 is affected by thermal expansion or contraction or is otherwise misaligned, the third seal (along with the second seal) will prevent hot plastic from passing through to the heater. As mentioned above, gate inserts 18 and 78 can be formed integrally as part of either the mold cavity or the mold core, where the injection nozzles are mounted in the core portion of the mold.

As will be apparent to those skilled in the art in the light of the foregoing disclosure, many alterations and modifications are possible in the practice of this invention without departing from the spirit or scope thereof. The foregoing description is of the preferred embodiments by way of example only, and is not to limit the scope of the invention.

What is claimed is:

1. A nozzle for use with a plastic injection mold gate defining a vestige, the nozzle comprising:

a main body portion including a central bore having an inlet portion, an enlarged threaded outlet portion, and an annular shoulder separating said portions;

a nozzle insert located in the outlet portion, the insert including an annular flange adapted to engage said annular shoulder;

a hollow threaded insert retainer threadably mounted in said outlet portion, the insert retainer having an inner annular shoulder for clamping engagement with the nozzle insert annular flange, an outer annular primary seal adapted to sealingly engage the mold gate behind the vestige, and an intermediate secondary sealing ring adapted to sealingly engage the mold gate behind the primary seal;

wherein the main body portion includes an annular surface adapted to sealingly engage the secondary sealing surface at a position behind the second seal, thereby creating a third seal.

2. A nozzle as claimed in claim 1 wherein the insert retainer further comprises a gripping flange located between the annular primary seal and the secondary sealing ring.

3. A nozzle as claimed in claim 2 wherein the gripping flange is in the form of a hexagonal bolt head.

4. A nozzle as claimed in claim 2 wherein the nozzle insert is in the form of a direct sprue nozzle tip.

5. A nozzle as claimed in claim 2 wherein the nozzle insert is in the form of a split flow nozzle tip.

6. A nozzle as claimed in claim 2 wherein the nozzle insert is torpedo-shaped, the insert annular flange including axial flow openings therethrough.

7. A nozzle as claimed in claim 6 wherein the insert retainer annular primary seal also defines the nozzle outlet.

8. A gate insert and nozzle combination comprising:
   a hollow gate insert body defining a vestige, a first cavity located behind the vestige and having an annular wall portion defining a primary sealing surface adjacent to the vestige, and a second cavity located behind the first cavity and having an annular wall portion defining a secondary sealing surface;
   a nozzle located in the hollow gate insert body, the nozzle having a main body portion including a central bore having an inlet portion, an enlarged threaded outlet portion, and an annular shoulder separating said portions;
   the nozzle also having a nozzle insert located in the outlet portion, the insert including an annular flange adapted to engage said annular shoulder;
   the nozzle also including a hollow threaded insert retainer threadably mounted in said outlet portion, the insert retainer having an inner annular shoulder for clamping engagement with the nozzle insert annular flange, an outer annular primary seal sealingly engaging the gate insert primary sealing surface, and an intermediate secondary sealing ring sealingly engaging the gate insert secondary sealing surface;
   wherein the main body portion includes an annular surface adapted to sealingly engage the secondary sealing surface at a position behind the second seal, thereby creating a third seal.

9. A gate insert and nozzle combination as claimed in claim 8 wherein the nozzle insert is in the form of a direct sprue nozzle tip having an outlet opening located adjacent to the gate insert vestige.

10. A gate insert and nozzle combination as claimed in claim 8 wherein the nozzle insert is torpedo-shaped, the insert retainer annular primary seal also defining the nozzle outlet.

* * * * *